No. 618,803. Patented Jan. 31, 1899.
C. POWERS.
TRACTION WHEEL.
(Application filed Jan. 3, 1898.)
(No Model.)
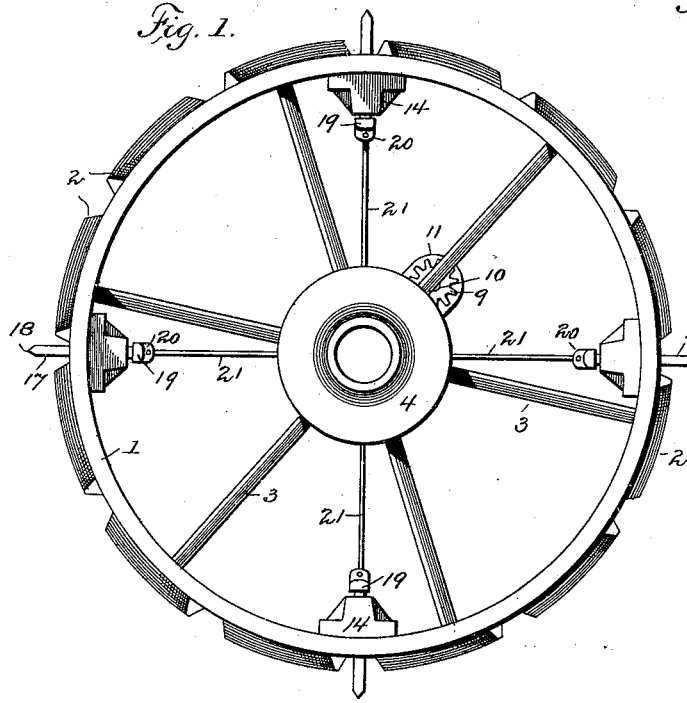
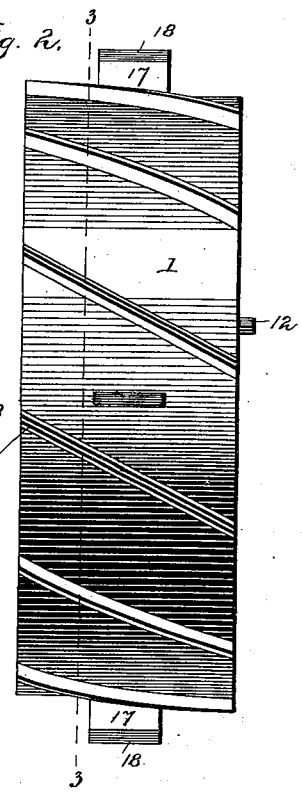
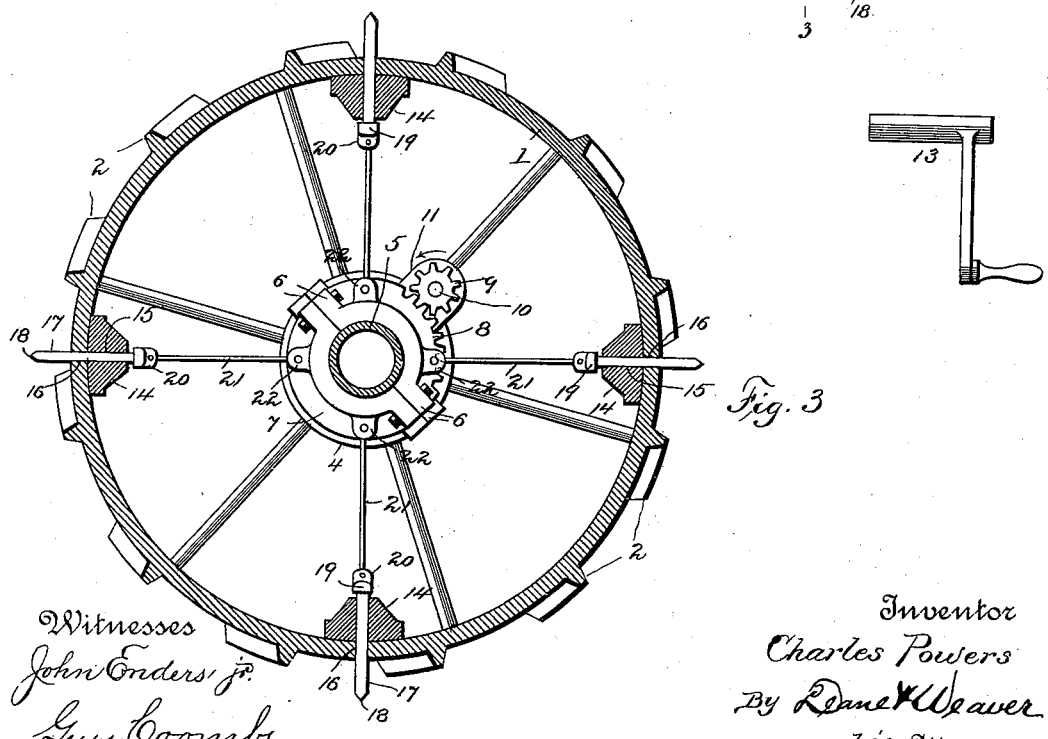
Witnesses
John Enders Jr.
Guy Coombs.
Inventor
Charles Powers
By Deane W. Weaver
his Attorneys

UNITED STATES PATENT OFFICE.

CHARLES POWERS, OF CHAPMAN, KANSAS, ASSIGNOR OF ONE-HALF TO JOHN CARROLL, OF SAME PLACE.

TRACTION-WHEEL.

SPECIFICATION forming part of Letters Patent No. 618,803, dated January 31, 1899.

Application filed January 3, 1898. Serial No. 665,409. (No model.)

*To all whom it may concern:*

Be it known that I, CHARLES POWERS, a citizen of the United States, residing at Chapman, in the county of Dickinson and State of Kansas, have invented certain new and useful Improvements in Traction-Wheels; and I do hereby declare the following to be a full, clear, and exact description of the invention, such as will enable others skilled in the art to which it appertains to make and use the same.

My invention relates to wheels for traction-engines and similar vehicles, and is substantially a mud shoe or hook for the same, presenting certain mechanical constructions to be hereinafter fully disclosed.

In describing my invention I will make use of the accompanying drawings, in which—

Figure 1 is a side elevation of the wheel with the hooks fully projected. Fig. 2 is a front view of the same. Fig. 3 is a vertical section on line 3 3.

In the several views the same numerals indicate the same part.

1 is the wheel-rim, with lugs 2, spokes 3, hubs 4, and the hub-sleeve 5, all substantially of a construction well known in the art.

Journaled upon the sleeve 5 and maintained in a mid-position between the hubs 4 and within the wheel by the sectional clamps 6 is a sectional disk 7, having the mutilated spur-gear 8, engaging a pinion 9, secured to the shaft 10, journaled in the bearing 11 of one of the clamps 6. The end of the shaft 10 has a square portion 12, fitting a removable key 13, by which the said shaft may be rotated.

Bolted at predetermined positions upon the inner face of the rim 1 are the castings 14, with rectangular openings 15, registering with similar rectangular slots 16 in the rim 1. Seated within the said openings 15 and slots 16 and reciprocating easily therein are the hook-plates 17, with the beveled point edges 18 and enlarged head 19, integral with which last are the parallel lugs 20, pivotally secured between which are the links 21, similarly pivoted to parallel lugs 22 of the disk 7.

By the use of the key 13 the pinion may be rotated, as in the direction of the arrow, also rotating the disk 7, and by tangential thrust upon the links 21 will push the hook-plates 17 through their guides and project them a considerable distance radially from the rim 1, forming effective mud shoes or hooks for traversing soft or muddy ground. In this position the links 21 become radially disposed to the disk 7 and are locked firmly into position. A turn of the key 13 in an opposite direction will fully retract.

Having fully described my invention and its obvious operation, what I claim as novel, and desire to secure by Letters Patent, is—

The combination with a traction-wheel and its axle, of a sleeve on said axle, a mutilated gear-wheel 7, sectional clamps for securing said mutilated gear-wheel upon the sleeve, said clamps having bearings 11; a shaft supported in said bearings and provided at its inner end with a gear-pinion meshing with the teeth of the mutilated gear-wheel, and squared at its outer end to receive a key, a series of radially-disposed plates extending through slots in the wheel-rim, blocks 14 on the inner side of the rim having slots alining with the slots in the rim and links 21 pivotally secured at their outer ends to the plates and at their inner ends to lugs on the disk.

In testimony whereof I affix my signature in presence of two witnesses.

CHARLES POWERS.

Witnesses:
J. A. YERKES,
D. P. HINCHEY.